(12) United States Patent
Himmelmann (10) Patent No.: US 8,207,644 B2
(45) Date of Patent: Jun. 26, 2012

(54) HYBRID CASCADING LUBRICATION AND COOLING SYSTEM

(75) Inventor: Richard A. Himmelmann, Beloit, WI (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 414 days.

(21) Appl. No.: 12/502,492

(22) Filed: Jul. 14, 2009

(65) Prior Publication Data

US 2011/0012447 A1    Jan. 20, 2011

(51) Int. Cl.
    *H02K 16/00* (2006.01)

(52) U.S. Cl. .......... 310/112; 310/114; 310/266; 310/54; 310/57

(58) Field of Classification Search .......... 310/112–114, 310/52, 54, 57, 62, 63, 266
See application file for complete search history.

(56) References Cited

U.S. PATENT DOCUMENTS

| | | | |
|---|---|---|---|
| 765,078 A * | 7/1904 | Jigouzo | 310/112 |
| 2,864,016 A * | 12/1958 | Waltscheff | 310/102 R |
| 3,676,764 A | 7/1972 | Syverson | |
| 3,701,911 A * | 10/1972 | Hallerback | 310/60 R |
| 4,684,873 A | 8/1987 | Glennon | |
| 4,887,020 A | 12/1989 | Graham | |
| 5,783,893 A * | 7/1998 | Dade et al. | 310/266 |
| 6,064,121 A | 5/2000 | Shervington et al. | |
| 6,087,746 A * | 7/2000 | Couvert et al. | 310/60 R |
| 6,105,743 A | 8/2000 | Salecker et al. | |
| 6,174,254 B1 | 1/2001 | Tsai | |
| 6,179,730 B1 | 1/2001 | Keller et al. | |
| 6,290,620 B1 | 9/2001 | Tsai et al. | |
| 6,332,204 B1 | 12/2001 | Russell | |
| 6,380,653 B1 * | 4/2002 | Seguchi | 310/112 |
| 6,465,928 B1 | 10/2002 | Shervington et al. | |
| 6,499,209 B1 | 12/2002 | Landin et al. | |
| 6,628,005 B2 | 9/2003 | Nelson et al. | |
| 6,727,609 B2 | 4/2004 | Johnsen | |
| 7,013,859 B2 | 3/2006 | Linnig | |
| 7,230,363 B2 | 6/2007 | Stout et al. | |

(Continued)

FOREIGN PATENT DOCUMENTS

JP    2011019391 A    1/2011

OTHER PUBLICATIONS

Non-Final Office Action dated Aug. 25, 2011 for U.S. Appl. No. 12/499,292.

*Primary Examiner* — Dang Le
(74) *Attorney, Agent, or Firm* — Cantor Colburn LLP (57) ABSTRACT

A hybrid cascading lubrication and cooling system (200, 400) for an electrical machine (102) with nested stages is provided. The electrical machine (102) includes an inner nested stage (444) nested with respect to an outer nested stage (446). An oil pump (222) is coupled to an oil pump inlet tube (226) to draw oil from an oil sump (224), and a cooling core (230) to distribute pumped oil within the electrical machine (102). A rotor member (212) is coupled to the inner nested stage (444) and the outer nested stage (446). The rotor member (212) centrifugally pumps oil from the cooling core (230) through inner radial holes (424) and outer radial holes (436) in the rotor member (212) upon rotation about a central axis (216) of the electrical machine (102).

10 Claims, 5 Drawing Sheets

U.S. PATENT DOCUMENTS

| | | |
|---|---|---|
| 7,268,522 B1 | 9/2007 | Baker |
| 7,385,332 B2 | 6/2008 | Himmelmann et al. |
| 7,389,712 B2 | 6/2008 | Himmelmann |
| 7,400,077 B2 * | 7/2008 | Caroon ................. 310/266 |
| 7,500,416 B2 | 3/2009 | Fenioux et al. |
| 7,511,392 B2 | 3/2009 | Rubbo et al. |
| 7,514,806 B2 | 4/2009 | Xu et al. |
| 7,535,147 B2 | 5/2009 | Nakahara et al. |
| 7,586,224 B2 | 9/2009 | Osborn et al. |
| 7,915,869 B2 | 3/2011 | Xu et al. |
| 2003/0057706 A1 | 3/2003 | Nelson et al. |
| 2003/0155202 A1 | 8/2003 | Taniguchi |
| 2004/0000820 A1 | 1/2004 | Cromas et al. |
| 2006/0041765 A1 | 2/2006 | Taniguchi et al. |
| 2006/0071575 A1 | 4/2006 | Jansen et al. |
| 2007/0151918 A1 | 7/2007 | Fenioux et al. |
| 2008/0116695 A1 | 5/2008 | Peterson |
| 2008/0197634 A1 | 8/2008 | Himmelmann |
| 2008/0197730 A1 | 8/2008 | Himmelmann et al. |
| 2009/0184691 A1 | 7/2009 | Birdi et al. |
| 2011/0006545 A1 | 1/2011 | Himmelmann |

* cited by examiner

HYBRID CASCADING LUBRICATION AND COOLING SYSTEM

CROSS-REFERENCE TO RELATED APPLICATIONS

This application contains subject matter related to the subject matter of the following co-pending applications, which are assigned to the same assignee as this application, Hamilton Sundstrand Corporation of Windsor Locks, Conn. The below listed applications are hereby incorporated by reference in their entirety:

U.S. patent application Ser. No. 12/486,365, entitled NESTED TORSIONAL DAMPER FOR AN ELECTRIC MACHINE; and U.S. patent application Ser. No. 12/499,292, entitled NESTED EXCITER AND MAIN GENERATOR STAGES FOR A WOUND FIELD GENERATOR

BACKGROUND OF THE INVENTION

The subject matter disclosed herein generally relates to lubrication and cooling of electrical machines, and more particularly to hybrid cascading lubrication and cooling for an electrical machine with nested stages.

An electrical machine may include one or more stages arranged sequentially along a shaft as a rotor assembly. To cool the electrical machine, cooling oil can be pumped into the inside diameter of the shaft. The cooling oil flows through the rotor assembly to remove heat. The cooling oil can be pressurized and sprayed directly from the shaft to cool components in close physical proximity to the shaft. However, such a cooling and lubrication scheme may be ineffective if cooling oil cannot be pumped through the shaft or components to be cooled are not directly reachable by spray from the shaft.

BRIEF DESCRIPTION OF THE INVENTION

According to one aspect of the invention, a hybrid cascading lubrication and cooling system for an electrical machine with nested stages is provided. The electrical machine includes an inner nested stage and an outer nested stage, where the inner nested stage is radially nested about a central axis of the electrical machine with respect to the outer nested stage. The hybrid cascading lubrication and cooling system includes an oil pump coupled to an oil pump inlet tube to draw oil from an oil sump, and a cooling core to distribute pumped oil within the electrical machine. A rotor member is coupled to the inner nested stage and the outer nested stage of the electrical machine. The rotor member centrifugally pumps oil from the cooling core through inner radial holes and outer radial holes in the rotor member upon rotation about the central axis of the electrical machine.

According to yet another aspect of the invention, a method for producing a hybrid cascading lubrication and cooling system for an electrical machine with nested stages is provided. The electrical machine includes an inner nested stage and an outer nested stage, where the inner nested stage is radially nested about a central axis of the electrical machine with respect to the outer nested stage. The method includes coupling an oil pump to an oil pump inlet tube to draw oil from an oil sump, and configuring a cooling core to distribute pumped oil within the electrical machine. The method additionally includes coupling a rotor member to the inner nested stage and the outer nested stage of the electrical machine. The rotor member is configured to centrifugally pump oil from the cooling core through inner radial holes and outer radial holes in the rotor member upon rotation about the central axis of the electrical machine.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
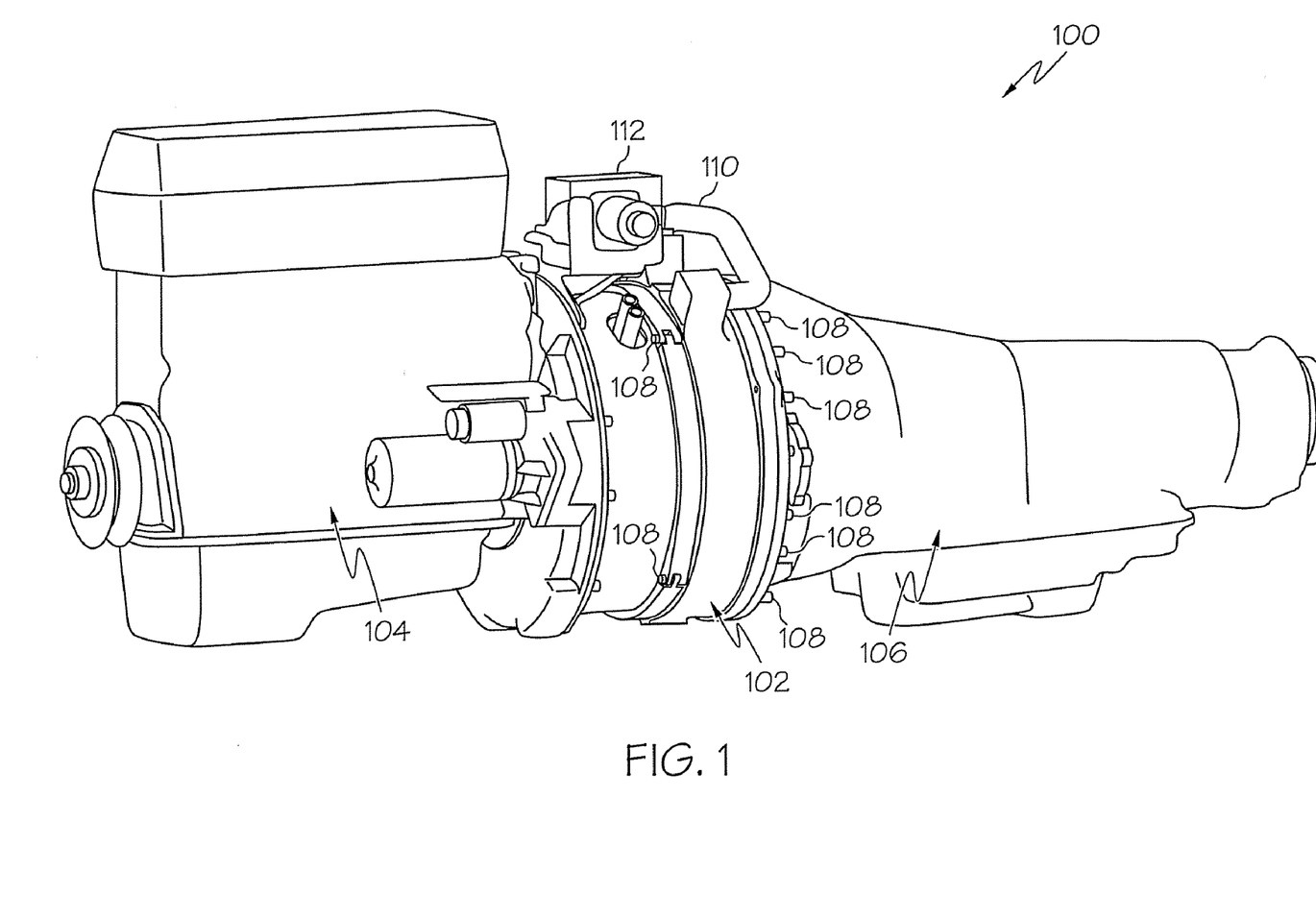
FIG. 1 illustrates an exemplary embodiment of a driveline system that includes an electrical machine installed in the driveline system.

FIG. 1 illustrates an exemplary embodiment of a driveline system 100. In an exemplary embodiment, the driveline system 100 is part of a land-based vehicle driveline, such as a truck or a tank. The driveline system 100 includes an electrical machine 102 inserted between an engine 104 and a transmission 106. In an exemplary embodiment, the electrical machine 102 has coupling points 108 that align with existing coupling points on the engine 104 and transmission 106. Thus, the impact on existing components, such as the engine 104 and transmission 106, can be minimized when the electrical machine 102 is inserted into the driveline system 100. While the electrical machine 102 is depicted between the engine 104 and transmission 106, it will be understood that the arrangement of components on the driveline system 100 is not so limited. For instance, there may be additional components, such as a clutch inserted in the driveline system 100, or the electrical machine 102 may be coupled to the opposite end of the transmission 106 if a smaller diameter is desired for the electrical machine 102. The electrical machine 102 may be a generator or alternator for producing electrical current and voltage responsive to mechanical rotation.

In an exemplary embodiment, the electrical machine 102 is coupled to external tubing 110 to route oil to and from a heat exchanger/relief valve/filter assembly (ERFA) 112. Oil that circulates through the electrical machine 102 draws heat generated by the electrical machine 102 and also lubricates components of the electrical machine 102. The oil in the electrical machine 102 may also capture particulate matter and other debris from within the electrical machine 102. One or more pumps circulate the oil through the external tubing 110 to the ERFA 112, where the oil is cooled and filtered prior to returning to the electrical machine 102.

Figure 2:
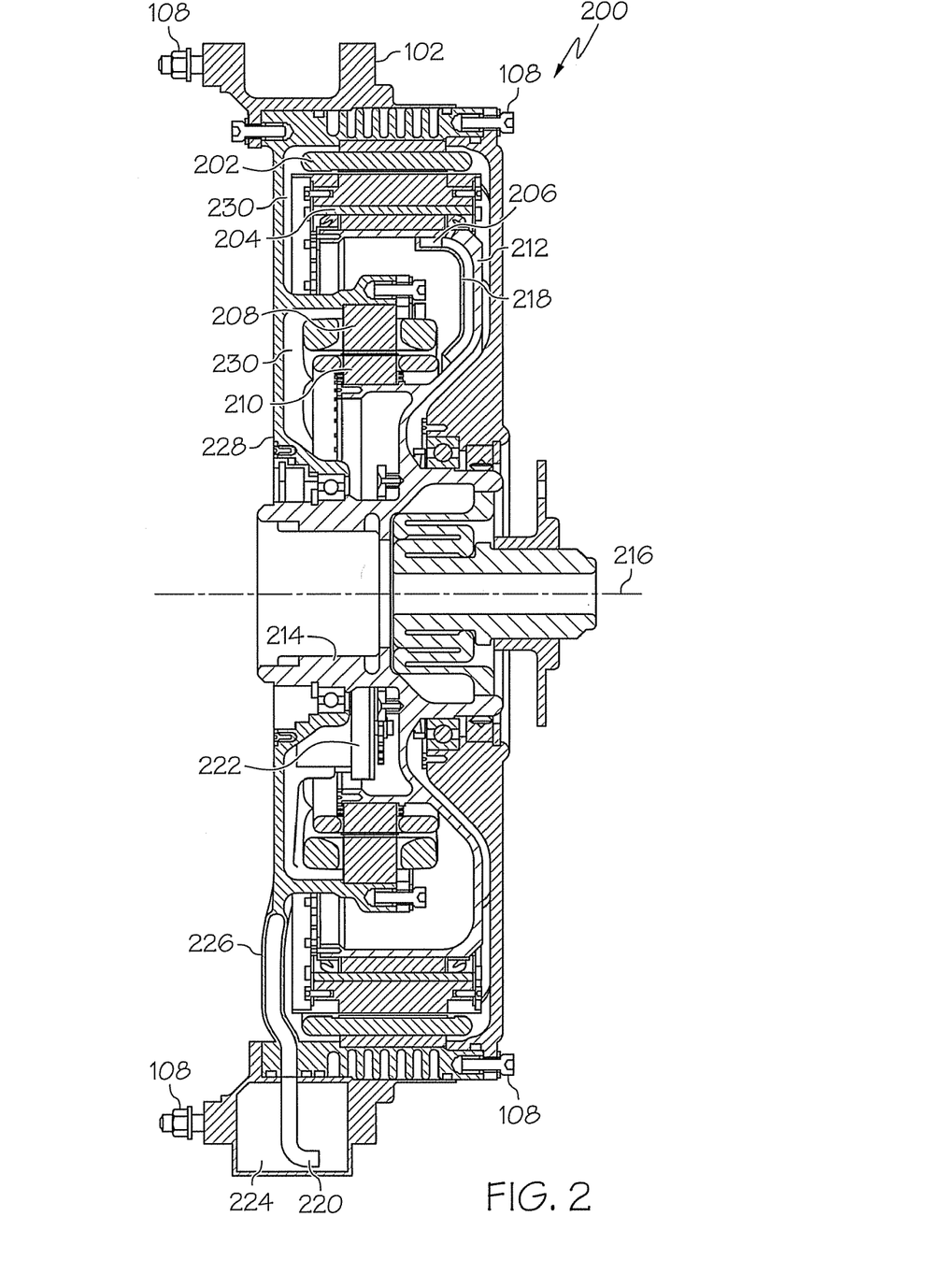
FIG. 2 depicts a cut-away view of an exemplary embodiment of a hybrid cascading lubrication and cooling system for an electrical machine with nested stages.

FIG. 2 depicts a cut-away view of an exemplary embodiment of a hybrid cascading lubrication and cooling system 200 for the electrical machine 102 of FIG. 1. In the exemplary embodiment of the electrical machine 102 depicted in FIG. 2, the electrical machine 102 is a nested wound field generator with an outer stage stator 202, a outer stage rotor 204, a rotating rectifier assembly 206, an inner stage stator 208, and an inner stage rotor 210. The outer stage rotor 204 and the inner stage rotor 210 are coupled to a rotor member 212, which is driven by the rotation of driveshaft 214. In an exemplary embodiment, the driveshaft 214 rotates about a central axis 216 of the electrical machine 102, causing the rotor member 212 to rotate. The outer stage stator 202 and inner stage stator 208 remain stationary as the rotor member 212 rotates. The rotating rectifier assembly 206 may be located in close proximity to the outer stage rotor 204 or the inner stage rotor 210 on the rotor member 212, and electrically coupled to both the outer stage rotor 204 and the inner stage rotor 210. A wire cover 218 may be used to hold wiring in support of the rotating rectifier assembly 206.

As the driveshaft 214 rotates, the rotor member 212 rotates the inner stage rotor 210 in close proximity to the inner stage stator 208, and the outer stage rotor 204 rotates in close proximity to the outer stage stator 202. Applying a DC source, such as current from a battery or alternator (not depicted), to the inner stage stator 208 results in a DC field to establish field communication inducing an alternating current in the inner stage rotor 210 as the rotor member 212 rotates. The alternating current in the inner stage rotor 210 flows through the rotating rectifier assembly 206 to produce a direct current in the outer stage rotor 204. The direct current in the outer stage rotor 204 creates a DC field to establish field communication inducing an alternating current in the outer stage stator 202 as the rotor member 212 rotates. The AC in the outer stage stator 202 can be converted to DC via an external output rectifier assembly. Thus, the electrical machine 102 can convert the mechanical rotation of the driveshaft 214 into a high voltage DC power source.

As can be seen in FIG. 2, the outer stage stator 202, outer stage rotor 204, inner stage stator 208, and inner stage rotor 210 are arranged concentrically about the central axis 216, such that the inner stage stator 208 and the inner stage rotor 210 are radially nested about the central axis 216 of the electrical machine 102 with respect to the outer stage stator 202 and the outer stage rotor 204. This configuration results in a minimal impact to the overall length of the driveline system 100 of FIG. 1 when the electrical machine 102 is inserted between the engine 104 and the transmission 106 and attached at coupling points 108.

The sequence in which nested rotors and stators as nested stages are spaced extending from the driveshaft 214 can vary within the scope of the invention. For example, the radial distance between the inner stage rotor 210 and the central axis 216 may be less than the radial distance between the inner stage stator 208 and the central axis 216 as depicted in FIG. 2. As an alternate configuration, the radial distance between the inner stage rotor 210 and the central axis 216 can be greater than the radial distance between the inner stage stator 208 and the central axis 216, for instance, reversing the relative position of the inner stage stator 208 and the inner stage rotor 210 depicted in FIG. 2. In similar fashion, the radial distance between the outer stage rotor 204 and the central axis 216 can be less than the radial distance between the outer stage stator 202 and the central axis 216 as depicted in FIG. 2. Conversely, the radial distance between the outer stage rotor 204 and the central axis 216 may be greater than the radial distance between the outer stage stator 202 and the central axis 216.

To cool and lubricate components of the electrical machine 102, a hybrid cascading lubrication and cooling system 200 is integrated in the electrical machine 102. An oil pickup tube 220 draws oil responsive to oil pump 222 from oil sump 224. Oil is drawn up oil pump inlet tube 226 to the oil pump 222 and continues to oil pump outlet tube 228. The oil may flow from the oil pump outlet tube 228 to the ERFA 112 of FIG. 1 via the external tubing 110, where heat is extracted from the oil and the oil is filtered. The cooled and filtered oil returns to the electrical machine 102 for distribution in cooling core 230. Centrifugal pumping action of the rotor member 212 rotating drives the oil throughout the electrical machine 102. While only a single oil pump 222 is depicted in FIG. 2, multiple instances of the oil pump 222 can be utilized for redundancy and to keep the size of each oil pump 222 compact. Various types of pumps, such as vane, piston, or centrifugal positive displacement pumps, can be used to implement the oil pump 222. Furthermore, internally or externally integrated primary pumps or separate pumps can be used to move oil from the oil sump 224 to the ERFA 112 of FIG. 1.

Alternate embodiments of the electrical machine 102 include permanent magnet, induction, and switched reluctance generators and/or motors. In these alternate embodiments, one or more of the outer stage stator 202, outer stage rotor 204, rotating rectifier assembly 206, inner stage stator 208, and/or inner stage rotor 210 can be eliminated or replaced while still maintaining nested stages of the electrical machine 102. For example, the rotor member 212 may enable nesting of two separate permanent magnet generators on the driveshaft 214, where the hybrid cascading lubrication and cooling system 200 provides lubrication and cooling.

Figure 3:
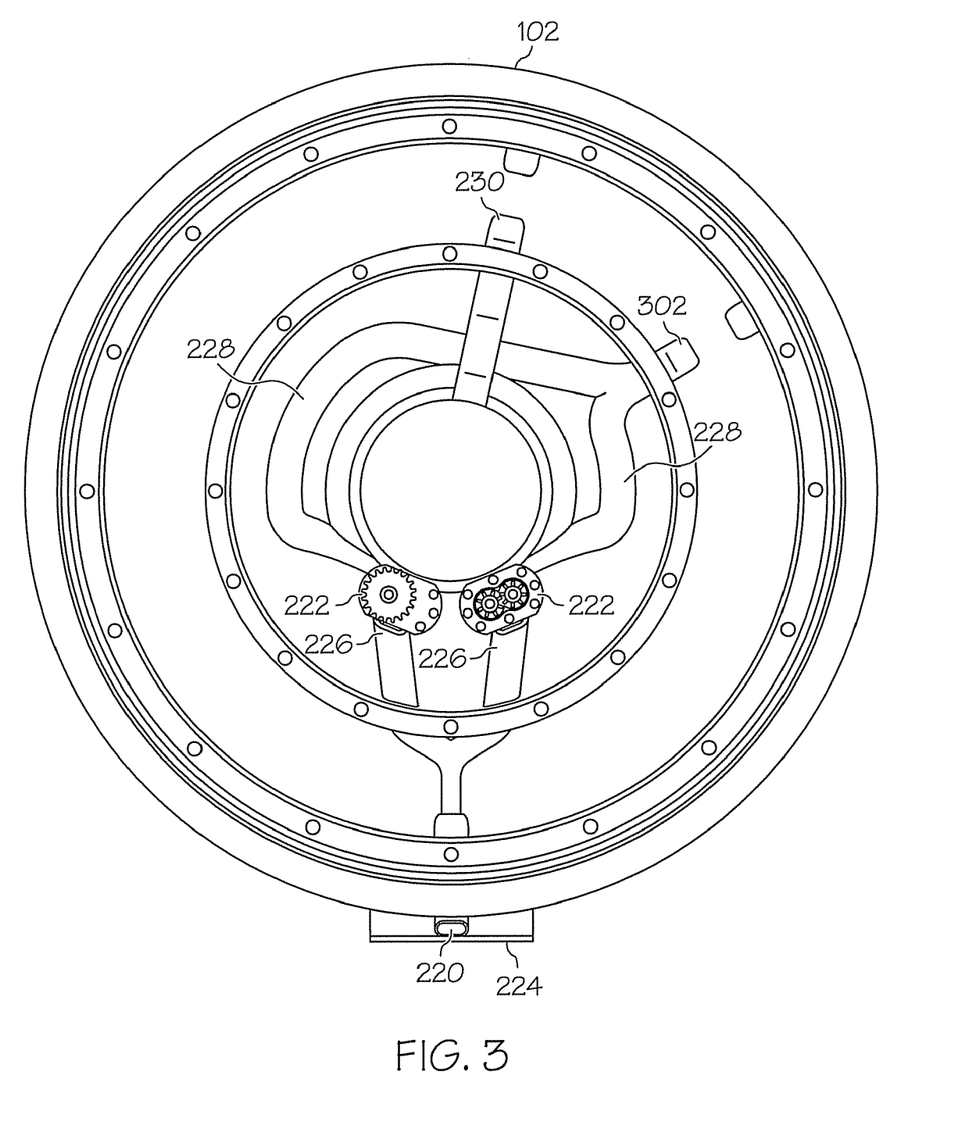
FIG. 3 illustrates a profile view of an exemplary embodiment of integrated tubing in an electrical machine.

FIG. 3 illustrates a profile view of an exemplary embodiment of integrated tubing in the electrical machine 102. As can be seen in FIG. 3, two oil pumps 222 can draw oil from the oil sump 224 using oil pickup tube 220 branching to two oil pump inlet tubes 226. The oil pumps 222 are positive-displacement pumps that may be driven off of the driveshaft 214 of FIG. 2 via gearing to lift the oil from the oil sump 224, and pump it to the ERFA 112 of FIG. 1. Oil flows from each oil pump 222 to a respective oil pump outlet tube 228 to a port 302, which combines the oil flow for the ERFA 112 of FIG. 1. Oil returning from the ERFA 112 of FIG. 1 is received at the cooling core 230 of FIG. 2, where it is distributed within the electrical machine 102, eventually returning to the oil sump 224.

Figure 4:
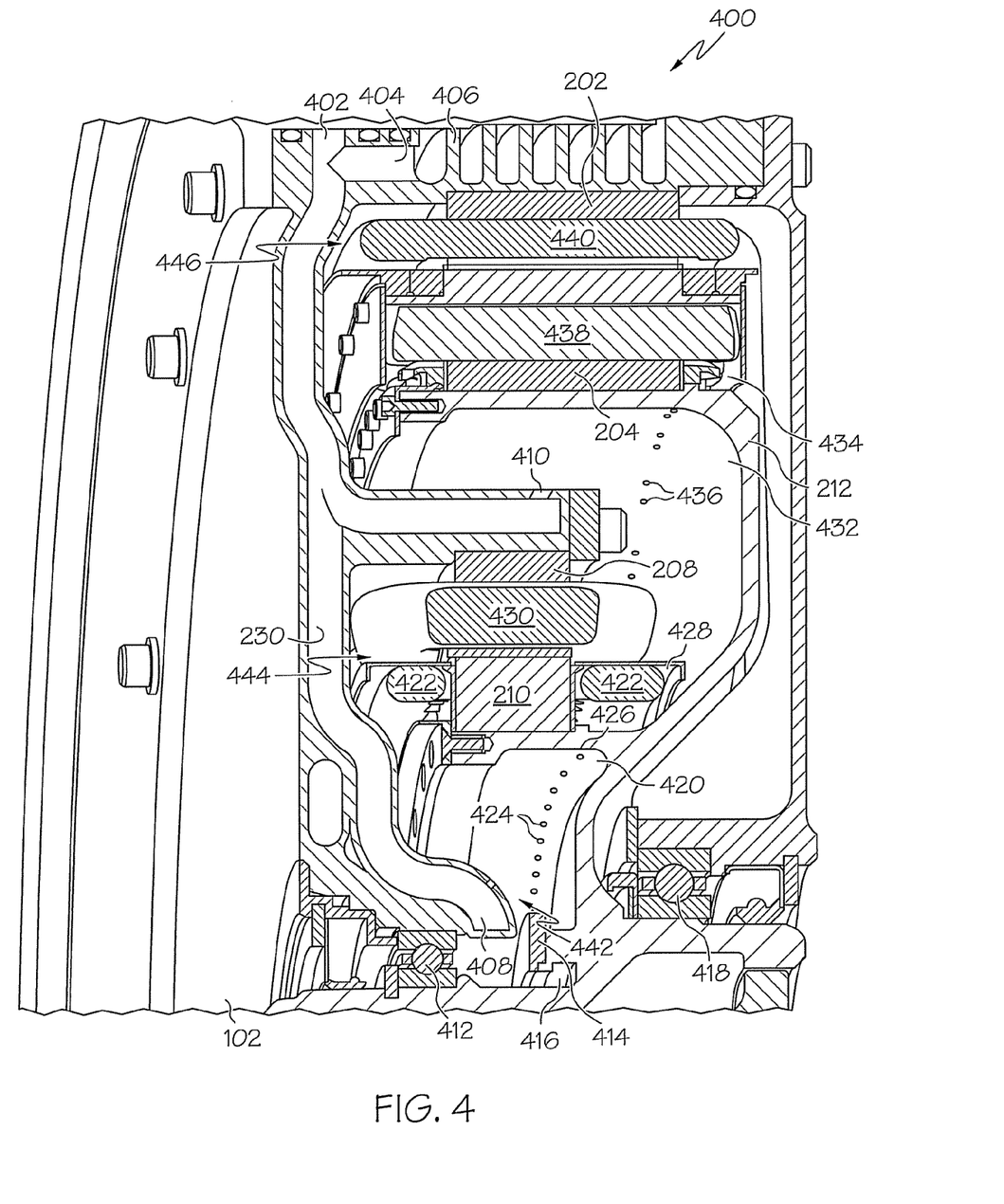
FIG. 4 illustrates a cut-away view of an exemplary embodiment of a hybrid cascading lubrication and cooling system for an electrical machine with nested stages.

FIG. 4 illustrates a hybrid cascading lubrication and cooling system 400 for electrical machine 102. The hybrid cascading lubrication and cooling system 400 represents a detailed view of an embodiment of the hybrid cascading lubrication and cooling system 200 of FIG. 2. As is illustrated in FIG. 4, oil enters the electrical machine 102 at port 402 into cooling core 230 for distribution. Oil may be received at the port 402 from the ERFA 112 of FIG. 1. A portion of the oil in the cooling core 230 flows to port 404 to cool a heat exchanger 406 of the electrical machine 102, and the oil then proceeds back to the oil sump 224 of FIGS. 2 and 3. The oil also flows down the cooling core 230 to ports 408 and 410. At port 408, oil exits the cooling core 230 and is sprayed onto bearing 412, gear 414, and into centrifugal reservoir 416 that supplies bearing 418 with oil. The gear 414 may be used to drive one or more oil pump 222 of FIGS. 2 and 3.

The bearings 412 and 418 enable the electrical machine 102 to be self-supporting. In an alternate embodiment, a crankshaft in the engine 104 of FIG. 1 is directly coupled to the rotor member 212, where the rotor member 212 acts as a flywheel for the engine 104. In this embodiment, bearings 412 and 418 can be omitted, as crankshaft bearings in the engine 104 may be sufficient to support rotation of the rotor member 212. The outer stage stator 202 and the inner stage stator 208 can be directly coupled to the engine 104. Thus, if bearings 412 and 418 are omitted, oil is not sprayed on the bearings 412 and 418. Such an embodiment may also eliminate the centrifugal reservoir 416.

At port 408, cooling oil leaves the cooling core 230, and is sprayed into inner stage centrifugal reservoir 420. In the inner stage centrifugal reservoir 420, the oil is pressurized by centrifugal pumping action of the rotor member 212 rotating, and oil is directed to flow across windings 422 of the inner stage rotor 210 providing cooling oil flow to the inner stage rotor 210. Oil gathers in the inner stage centrifugal reservoir 420 prior to passing through inner radial holes 424 in the circumference of rotor winding retention bands 426 of the rotor member 212. Oil also gathers in inner stage centrifugal reservoir 428 to cool the inner stage rotor 210.

Oil is sprayed from the inner stage centrifugal reservoir 428 across windings 430 of the inner stage stator 208 to provide a cooling oil flow to the inner stage stator 208. As the oil leaves the inner stage stator 208, it is collected by outer stage centrifugal reservoir 432 and outer stage centrifugal reservoir 434. The outer stage centrifugal reservoir 432 also receives supplemental cooling oil from the cooling core 230 at port 410. Oil at the outer stage centrifugal reservoir 432 is re-pressurized by centrifugal pumping action of the rotor member 212 rotating, prior to flowing through outer radial holes 436 in the rotor member 212. As oil passes through the outer radial holes 436, the oil is directed to flow across windings 438 of the outer stage rotor 204, providing cooling oil to the outer stage rotor 204.

Oil is trapped in the outer stage centrifugal reservoir 434 prior to leaving the outer stage rotor 204 and spraying on windings 440 of the outer stage stator 202. After oil is sprayed on the windings 440, the oil is forced by gravity back to the oil sump 224 of the electrical machine 102, as depicted in FIGS. 2 and 3.

The combination of components that enable oil to flow from the oil sump 224 to the ERFA 112 of FIG. 1 and distribute the oil within the electrical machine 102 forms the hybrid cascading lubrication and cooling system 400. However, the ERFA 112 does not need to be included in the hybrid cascading lubrication and cooling system 400. Oil distribution within the electrical machine 102 uses the centrifugal pumping action of the rotor member 212 rotating to provide motive force to cause the oil to flow throughout the electrical machine 102. Oil delivered to electrical machine core 442 is collected and passed through inner radial holes 424 to inner nested stage 444 of the electrical machine 102. Oil in the inner nested stage 444 is centrifugally pumped towards outer nested stage 446, where supplemental oil is added from port 410 prior to passing through outer radial holes 436 to the outer nested stage 446. The inner nested stage 444 may include the inner stage stator 208 and the inner stage rotor 210, and the outer nested stage 446 may include the outer stage stator 202 and the outer stage rotor 204. The inner nested stage 444 is radially nested about the central axis 216 of the electrical machine 102 with respect to the outer nested stage 446. In alternate embodiments, the inner nested stage 444 and the outer nested stage 446 can include other field generating components, such as magnets, rather than using windings. Additionally, the inner nested stage 444 and the outer nested stage 446 can be electrically independent, resulting in separate voltage outputs from the electrical machine 102.

The flow of oil between the inner stage centrifugal reservoirs 420 and 428 and the outer stage centrifugal reservoirs 432 and 434 acts as cascading cooling shelves as oil moves between centrifugal reservoirs. Geometry of the rotor member 212 within the electrical machine 102 forms the inner stage centrifugal reservoir 420 and the outer stage centrifugal reservoir 432, which feed the inner radial holes 424 and outer radial holes 436 to centrifugally transfer oil radially outward. The inner radial holes 424 and outer radial holes 436 direct the oil from the inner stage centrifugal reservoir 420 and the outer stage centrifugal reservoir 432 to respective sources of heat for cooling and lubrication.

Figure 5:
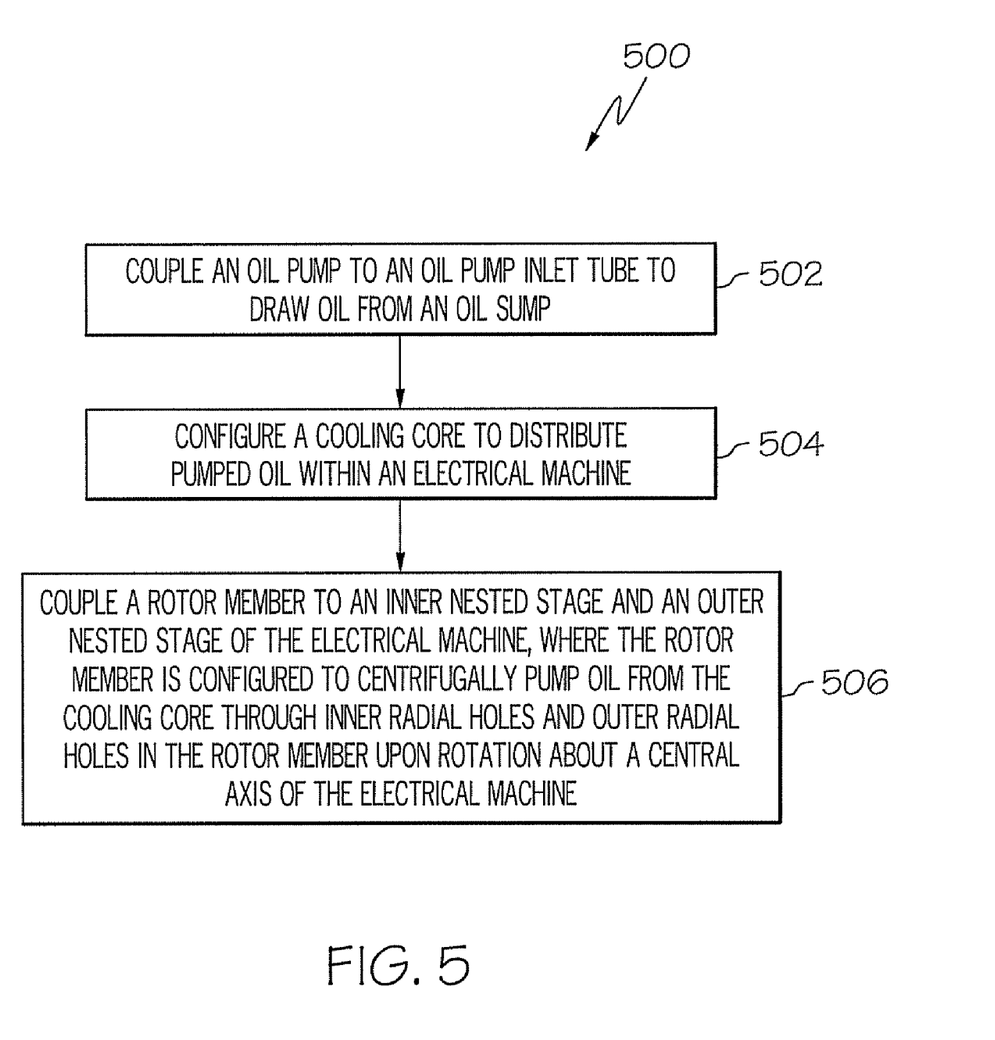
FIG. 5 depicts a process for producing a hybrid cascading lubrication and cooling system for an electrical machine with nested stages.

FIG. 5 depicts a process 500 for producing a hybrid cascading lubrication and cooling system 400 in an electrical machine with nested stages, such as the electrical machine 102 of FIGS. 1-4. As previously described, the inner nested stage 444 is radially nested about central axis 216 of the electrical machine 102 with respect to the outer nested stage 446. The inner nested stage 444 may include inner stage stator 208 and inner stage rotor 210. The outer nested stage 446 may include outer stage stator 202 and outer stage rotor 204.

At block 502, oil pump 222 is coupled to oil pump inlet tube 226 to draw oil from oil sump 224. Additional oil pumps 222 can also be used depending upon the desired flow rate and sizing constraints. For example, as depicted in FIG. 3, a second oil pump 222 can be coupled to a second oil pump inlet tube 226 to draw oil from the oil sump 224. The second oil pump outlet tube 228 may be coupled to the second oil pump 222. Port 302 of FIG. 3 can be coupled to the oil pump outlet tube 228 and the second oil pump outlet tube 228 to combine oil flow from the oil pump 222 and the second oil pump 222 prior to routing the oil flow to the ERFA 112 of FIG. 1. The cooling core 230 may receive oil returned from the ERFA 112.

At block 504, cooling core 230 is configured to distribute pumped oil within the electrical machine 102. Oil can be directed through port 404 coupled to the cooling core 230 to cool the heat exchanger 406 of the electrical machine 102. Oil can also be directed through port 408 coupled to the cooling core 230 to cool and lubricate bearing 412 and gear 414 of the electrical machine 102. Port 408 may supply oil to centrifugal reservoir 416, which in turn supplies bearing 418 with oil. Port 408 can also supply oil to inner stage centrifugal reservoir 420 of the inner nested stage 444. Port 410 may also be coupled to the cooling core 230, where port 410 provides a flow path to combine supplemental oil with oil from the inner nested stage 444 at outer stage centrifugal reservoir 432 of the outer nested stage 446.

At block 506, rotor member 212 is coupled to the inner nested stage 444 and the outer nested stage 446. For example, the rotor member 212 can be coupled to the inner stage rotor 210 and the outer stage rotor 204. The rotor member 212 is configured to centrifugally pump oil from the cooling core 230 through inner radial holes 424 and outer radial holes 436 in the rotor member 212 upon rotation about the central axis 216 of the electrical machine 102. The inner radial holes 424 provide a flow path for oil from the inner stage centrifugal reservoir 420 through the inner nested stage 444, which can cool and lubricate the inner stage stator 208 and the inner stage rotor 210. The outer radial holes 436 provide a flow path for oil from the outer stage centrifugal reservoir 432 through the outer nested stage 446, which can cool and lubricate the outer stage stator 202 and the outer stage rotor 204. The rotation of the rotor member 212 provides centrifugal pumping force to cascade oil from electrical machine core 442 to inner nested stage 444 to outer nested stage 446.

As described herein, the hybrid cascading lubrication and cooling system 400 produced via process 500 of FIG. 5 is integrated in electrical machine 102. The electrical machine 102 can be connected inline on driveline system 100 via coupling points 108, for instance, to couple the electrical machine 102 to engine 104 and transmission 106 of FIG. 1. The engine 104, electrical machine 102, and transmission 106 may be driven by driveshaft 214 of FIG. 2. Various arrangements of the inner stage rotor 210, inner stage stator 208, outer stage rotor 204, and outer stage stator 202 can be used to place components closer or further from the central axis 216. Keeping components with a higher mass closer to the central axis 216 may affect the moment of inertia and other design/performance parameters of the electrical machine 102.

Technical effects include providing cooling and lubrication for a driveline installable electrical machine with nested stages. The nested design of the inner and outer stages of the electrical machine, when used with the centrifugal reservoir geometry illustrated in FIGS. 2 and 4, enables a high energy density electrical machine to be packaged with a shorter axial length. The combined use of positive displacement pumps to provide suction with centrifugal pumping action of nested stages creates a hybrid cascading lubrication and cooling system with high reliability to lubricate and cool an electrical machine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid cascading lubrication and cooling system (200, 400) for an electrical machine (102), the electrical machine (102) comprising an inner nested stage (444) and an outer nested stage (446), wherein the inner nested stage (444) is radially nested about a central axis (216) of the electrical machine (102) with respect to the outer nested stage (446), the hybrid cascading lubrication and cooling system (200, 400) comprising:
   an oil pump (222) coupled to an oil pump inlet tube (226) to draw oil from an oil sump (224);
   a cooling core (230) configured to distribute pumped oil within the electrical machine (102); and
   a rotor member (212) coupled to the inner nested stage (444) and the outer nested stage (446) of the electrical machine (102), rotor member (212) configured to centrifugally pump oil from the cooling core (230) through inner radial holes (424) and outer radial holes (436) in the rotor member (212) upon rotation about the central axis (216) of the electrical machine (102).

2. The hybrid cascading lubrication and cooling system (200, 400) of claim 1 further comprising a port (404) coupled to the cooling core (230) directing oil to a heat exchanger (406) of the electrical machine (102).

3. The hybrid cascading lubrication and cooling system (200, 400) of claim 1 further comprising a port (408) coupled to the cooling core (230) directing oil to a first bearing (412) and a gear (414) of the electrical machine (102).

4. The hybrid cascading lubrication and cooling system (200, 400) of claim 3 wherein the port (408) supplies oil to a centrifugal reservoir (416), and the centrifugal reservoir (416) supplies a second bearing (418) with oil.

5. The hybrid cascading lubrication and cooling system (200, 400) of claim 3 wherein the port (408) supplies oil to an inner stage centrifugal reservoir (420) of the inner nested stage (444).

6. The hybrid cascading lubrication and cooling system (200, 400) of claim 5 wherein the inner radial holes (424) provide a flow path for oil from the inner stage centrifugal reservoir (420) through the inner nested stage (444).

7. The hybrid cascading lubrication and cooling system (200, 400) of claim 1 further comprising a port (410) coupled to the cooling core (230), wherein the port (410) provides a flow path to combine supplemental oil with oil from the inner nested stage (444) at an outer stage centrifugal reservoir (432) of the outer nested stage (446).

8. The hybrid cascading lubrication and cooling system (200, 400) of claim 7 wherein the outer radial holes (436) provide a flow path for oil from the outer stage centrifugal reservoir (432) through the outer nested stage (446).

9. The hybrid cascading lubrication and cooling system (200, 400) of claim 1 further comprising an oil pump outlet tube (228) to route oil flow from the oil pump (222) to a heat exchanger/relief valve/filter assembly (ERFA) (112), wherein the cooling core (230) receives oil returned from the ERFA (112).

10. The hybrid cascading lubrication and cooling system (200, 400) of claim 9 further comprising:
   a second oil pump (222) coupled to a second oil pump inlet tube (226) to draw oil from the oil sump (224);
   a second oil pump outlet tube (228) coupled to a second oil pump (222); and
   a port (302) to combine oil flow from the oil pump outlet tube (228) and the second oil pump outlet tube (228) prior to the ERFA (112).

* * * * *